United States Patent [19]

Stana et al.

[11] Patent Number: 4,704,010
[45] Date of Patent: Nov. 3, 1987

[54] DEVICE FOR GENERATING AN OPTICAL COLLIMATING BEAM

[75] Inventors: Hans Stana, Oberkochen; Werner Renner, Heidenheim, both of Fed. Rep. of Germany

[73] Assignee: Carl-Zeiss-Stiftung, Heidenheim, Fed. Rep. of Germany

[21] Appl. No.: 584,482

[22] Filed: Feb. 28, 1984

[30] Foreign Application Priority Data

May 7, 1983 [EP] European Pat. Off. ........ 83104503.4

[51] Int. Cl.⁴ ............................................. G02B 17/00
[52] U.S. Cl. .................................. 350/444; 350/252; 350/566
[58] Field of Search ............... 350/444, 442, 242, 245, 350/252, 253, 566

[56] References Cited

U.S. PATENT DOCUMENTS

| 2,423,492 | 7/1947 | Fairbank | 350/252 |
| 2,656,761 | 10/1953 | Blaisse | 350/444 |
| 3,362,074 | 1/1968 | Luebkeman et al. | 350/566 |

FOREIGN PATENT DOCUMENTS 0069575 12/1983 European Pat. Off.
2056634 5/1979 United Kingdom.

Primary Examiner—Bruce Y. Arnold
Assistant Examiner—P. M. Dzierzynski
Attorney, Agent, or Firm—Walter Ottesen

[57] ABSTRACT

The invention is directed to a device for generating an optical collimating beam. The device is so configured that it withstands extreme mechanical and thermal stresses and that the collimating beam is always at a precisely defined angle with respect to the base that supports the device. The device includes a single-lens objective having a first optical surface upon which the collimating mark is arranged which the objective images at infinity. The objective is made of transparent material having a linear temperature coefficient of expansion of less than $10^{-6} K^{-1}$. The objective is held in a metal housing in a form-tight manner and a thin layer surrounding the peripheral surface of the lens is disposed between the objective and the metal housing. This layer is made of an elastic material which is permanently elastic. The housing is connected form-tight and lock-tight with the base. The attachment is protected against shock and vibrational stress.

7 Claims, 7 Drawing Figures

DEVICE FOR GENERATING AN OPTICAL COLLIMATING BEAM

FIELD OF THE INVENTION

The invention relates to a device for generating an optical collimating beam. The device is adapted for mounting on a base and the beam and base conjointly define a definitive angle even in situations where extreme mechanical and thermal stress is present.

BACKGROUND OF THE INVENTION

A device of the kind referred to above is applicable to testing long guideways of tool machinery and for determining angular deviations between the axis of parts of large machines. The device here serves as an adjusting collimator having a collimating beam which can be observed in a telescope which is appropriately configured. If the collimating mark imaged at infinity of the adjusting collimator is configured so that it supplements a sighting mark in the telescope in a manner to form a symmetrical figure, then deviations which occur under rough operating conditions can be easily recognized and also measured with appropriate calibration. In this connection and depending upon the type of machine, extreme mechanical and thermal stress conditions can occur with respect to the adjusting collimator.

Up to the present time, adjusting collimators were utilized which were made up of several optical elements. Devices of this kind are accompanied in operation by very substantial difficulties because the correct adjusted condition of the elements with respect to each other is lost under high stress conditions. It is practically not possible to guarantee this adjusted condition without damage occurring to the optical elements in the presence of high mechanical stress.

SUMMARY OF THE INVENTION

In view of the foregoing, it is an object of the invention to provide a device for generating an optical collimating beam which is of simple configuration and which functions without malfunctioning even under high mechanical and thermal stress conditions.

The device according to the invention generates an optical collimating beam having a defined angle with respect to a base when mounted thereto. The device and base are subjectable to heat and mechanical loads such as shock, vibration or the like. The device includes a housing and collimating beam means mounted in the housing for forming and transmitting the collimated beam. The collimating beam means includes an objective which is preferably configured as a single-lens objective and transmits the collimating beam. The housing includes seating means for receiving and holding the objective in a form-tight manner. The objective is made of transparent material and preferably has a coefficient of expansion selected to ensure that the objective will withstand the thermally induced stress variations caused by the heat. Attachment means securely attach the housing to the base thereby preventing the mechanical stress and strain imparted to the device by the mechanical loads from loosening the housing and affecting the integrity of the angle. Elastic layer means is disposed at the interface of the objective and the housing for preventing direct contact therebetween thereby projecting the objective against damage from the mechanical loads.

The device of the invention avoids all of the difficulties associated with a plurality of optical elements which are adjusted one with respect to the other and reliably ensures the position of the objective in the housing without any direct contact between the objective and the metal housing. Such a contact would lead to the destruction of the objective in the presence of extreme mechanical stress. The objective is made of a material having an extremely low coefficient of expansion thereby ensuring that the device will also withstand extreme loading especially that associated with thermally induced stress variations.

The device according to the invention can include light supply means which can, for example, be in the form of a prism for conducting light to the collimating mark. The housing then includes second seating means for receiving and holding the prism in a form-tight manner.

With the device according to the invention, it is important that the device be securely attached to the base so that the device is not loosened in the presence of mechanical loads such as shock, vibration or the like. Accordingly, a preferred configuration for the above attachment means can, for example, be in the form of at least three bolts which threadably engage the base and securely attach the housing thereto. The attachment means preferably includes means for securing the bolts against rotation thereby preventing the housing of the device from becoming loose in the presence of mechanical loads.

Also, fixing means are provided for fixing the housing with respect to the base. The fixing means can preferably include a recess in the base and a cylindrical lug on the lower side of the housing for engaging the recess in a form-tight manner thereby fixing the position of the device with respect to the base.

The device according to the invention operates without difficulty also under conditions of extreme mechanical and thermal stress. Such stress conditions occur, for example, if the device is applied to monitor the spatial position of the opening of the barrel of a weapon such as a cannon for example. In this connection, the device is mounted in the vicinity of the barrel opening and the collimating beam emanating from the device reaches the sighting device. The collimating line of this sighting device is positioned to a precisely predetermined angle with respect to the axis of the cold cannon barrel when an adjustment is made. For this purpose, an adjusting device is placed in the barrel as described, for example, in German Pat. No. 1,257,039. The collimating beam travels in a direction opposite to the direction in which the projectile travels and, after adjustment is completed, reaches a predetermined position in the sighting device. In this application, the device of the invention is utilized as an adjusting collimator.

The barrel of the cannon becomes hot because of the projectiles which are discharged therefrom and can bend so that the axis of the region of the barrel opening which determines the direction of flight of the projectile is changed in its spatial position. This is manifested by a deviation of the collimating beam from its reference position so that the sighting device can be appropriately readjusted. Thereafter, the collimating beam again is in its correct position with reference to the axis of the barrel opening.

It is well understood that in this application of the device of the invention, the mechanical and thermal stresses imposed upon the collimator are especially large. In the vicinity of the barrel opening, forces are generated which can exceed 40,000 g.

BRIEF DESCRIPTION OF THE DRAWING

The invention will now be described with reference to the drawing wherein.

DESCRIPTION OF THE PREFERRED EMBODIMENTS OF THE INVENTION

Figure 1:
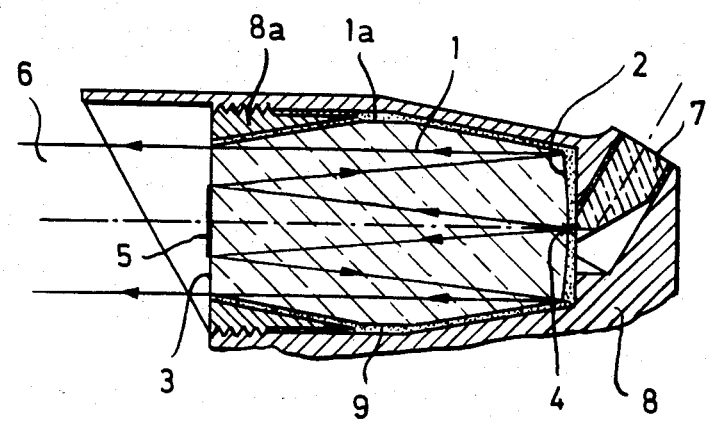
FIG. 1 is a section view taken through the housing of the device according to the invention and wherein the attachment of the housing to the base is not illustrated.

Referring to FIG. 1, reference numeral 1 designates a single-lens objective made of transparent material and having a linear coefficient of expansion of less than $10^{-6} \text{ K}^{-1}$. A suitable material for the objective 1 is quartz glass which is commercially available in the Federal Republic of Germany under the trade name HERASIL. The objective 1 of FIG. 1 is configured as a planoconvex lens. The lens 1 has a first optically effective surface 2 which is a convex surface upon which is disposed the collimating mark 4. The second optical surface 3 is provided with a reflective coating at its central portion 5. As shown in FIG. 1, the rays emanating from the collimating mark 4 are transformed in objective 1 into a parallel collimating beam 6 which images the collimating mark 4 at infinity.

The collimating mark 4 is illuminated in the embodiment of FIG. 1 with the aid of a prism 7 which conducts the light surrounding the mark 4 to the latter. It is understood that to illuminate the collimating mark 4, not only daylight can be used but also a separate illuminating unit in lieu thereof.

The objective 1 and the prism 7 are held in the housing 8 in a form-tight manner and the housing can, for example, be made of an alluminum alloy. A direct contact between the optical elements 1 and 7 and the metal housing 8 is prevented by surrounding the outer peripheral surface 1a of the objective 1 as well as the outer peripheral surface of the prism 7 with a layer 9 of elastic material that permanently retains its elasticity. This layer has a thickness of less than 0.3 mm and is made, for example, of a silicone glue.

The outer peripheral surface 1a of objective 1 is configured to be biconical which facilitates a form-tight seating in the housing 8. A ring 8a having a conical configuration threadably engages the housing 8 and serves to secure the position of the objective 1 therein.

Figure 2:
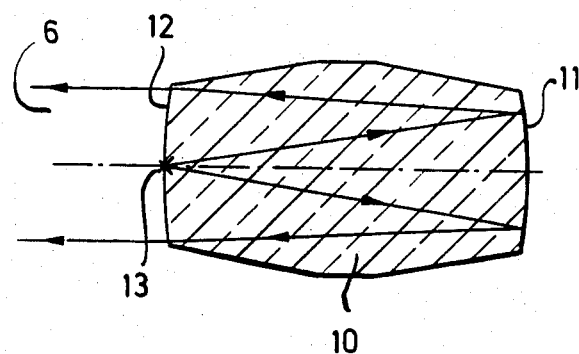
FIG. 2 is an alternate embodiment of the objective of the device of the invention.

The single-lens objective can have various forms. It is possible to provide spherical and aspherical effective surfaces. In the embodiment of FIG. 2, a single-lens objective 10 is illustrated which is configured to be biconvex. This objective has the collimating mark 13 arranged on the optical surface 12 from which the light defining the collimating beam 6 emanates. The surface 11 lying opposite surface 12 is completely coated with a reflective coating. The surfaces 11 and 12 coact to image the collimating mark 13 with a parallel collimating beam 6 at infinity.

Figure 3:
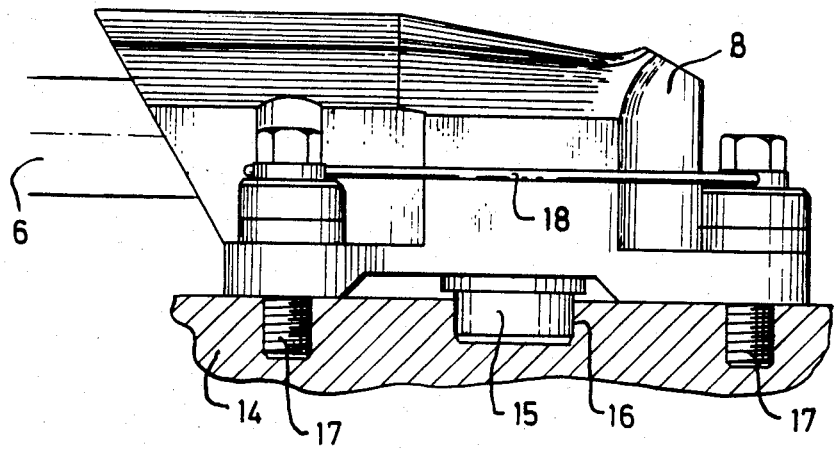
FIG. 3 is a side elevation view, partially in section, of the device according to the invention showing how the same is secured to the base.

The attachment of the housing 8 to the base 14 is illustrated in FIG. 3. The housing 8 is tightly joined to a cylindrical lug 15 which is inserted into a recess 16 formed in the base 14 so that a form-tight connection is achieved. A force-locked attachment of the housing 8 to the base 14 is achieved with the acid of three threaded bolts 17. These threaded bolts 17 are tightened with a predetermined torque and then are secured with the aid of a mechanical bolt-locking arrangement 18 so that the bolts do not loosen either because of vibration or because of shock.

Figure 5:
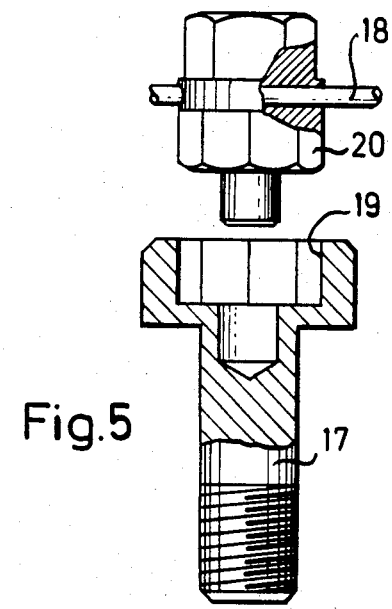
FIG. 5 is a side elevation view; partially in section, showing one of the bolts utilized to secure the housing to the base together with an example of locking means for locking the bolt in position.

FIG. 5 illustrates a possible bolt-locking arrangement wherein the threaded bolts 17 each include a recess 19 having a plurality of flats. A part having a peripheral surface 20 configured to correspond to that of the recess 19 is inserted into the latter. The part moreover has a bore through which a wire 18 can be threaded. The configuration of the flats 19 and 20 are selected so that there practically always will be a position found which will permit threading the wire 18 through the bolts 17 after the latter have been tightened.

Figure 4:
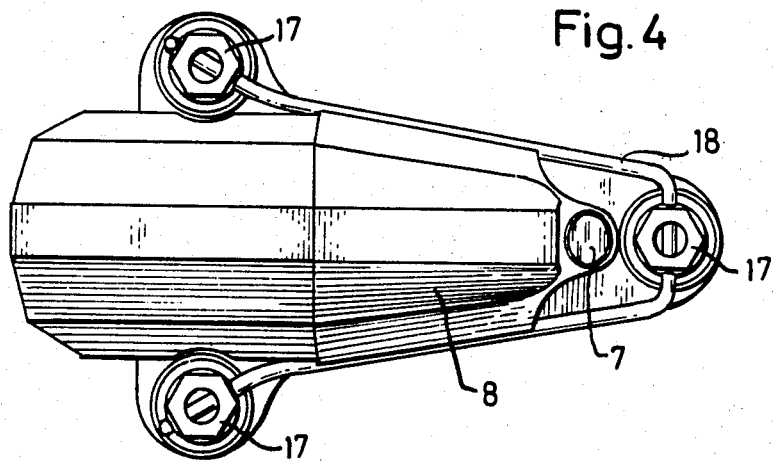
FIG. 4 is a plan view of the device of the invention shown in FIG. 3.
Figure 6:
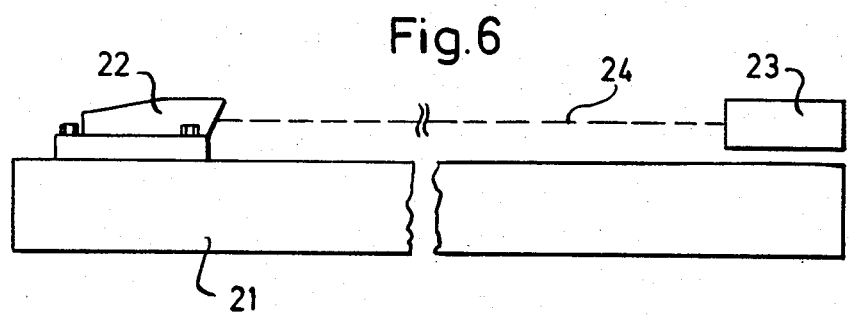
FIG. 6 is an elevation view showing an application of the device according to the invention wherein the same and a telescope are mounted on a long guideway for monitoring the latter; and, FIG. 7 shows the collimating marks as viewed in the telescope of FIG. 6.

FIG. 6 illustrates a base 21 which can, for example, be a long machine guideway or the barrel of a cannon. A device 22 for generating an optical collimating beam is mounted on one end of the guideway 21. This device corresponds in its configuration and with respect to its attchment to the guideway of the device shown in FIGS. 3 and 4. The device 22 generates an optical collimating beam 24 which is at a precisely defined angle to the base 21. The collimating beam 24 impinges upon the collimating apparatus 23 which can, for example, be configured as a telescope.

Figure 7:
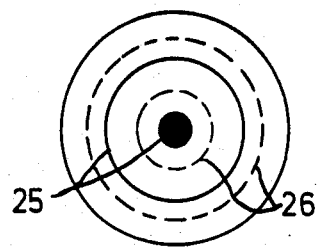

FIG. 7 shows a pattern which is exemplary of that which an observer would see when looking into the telescope 23 of FIG. 6. Two circular systems are evident whereby the one system 25 is formed by a projected collimating mark of the device 22 and the system 26 which corresponds to the collimating mark arranged within the telescope 23. A bending of the base 21 is noticed by the relative displacement of the collimating marking systems 25 and 26 whereby each deviation is immediately determined because of the symmetrical configuration of these systems.

It is understood that other collimating marks can be used. For example, cross marks made up of double hairs can be provided in the telescope 23; whereas, the device 22 can project a collimating mark in the form of a simple cross which lies precisely within the double cross hairs when in the adjusted position.

It is understood that the foregoing description is that of the preferred embodiments of the invention and that various changes and modifications may be made thereto without departing from the spirit and scope of the invention as defined in the appended claims.

What is claimed is:

1. A device for generating an optical collimating beam having a defined angle with respect to a base when mounted thereon, the device and base being subjectable to extreme heat and mechanical loads such as shock, vibration or the like, the device comprising:

a metal housing;

collimating beam means fora forming and transmitting said collimated beam, said collimating beam means including: a single-lens objective; a collimating mark formed on an optical surface of said objective; light supply means for illuminating said collimating mark; and, reflecting means for reflecting an image of said mark within and from said objective so as to define said optical collimating beam;

said objective being a planoconvex lens of which said first-mentioned optical surface is a convex surface, said lens having a second optical surface in the form of a plane surface adjacent said surface, said plane surface having a central portion; said reflecting means including means for reflecting the rays of said collimating beam within said objective so as to pass out therefrom through the uncoated remainder of said second optical surface; and, said last-mentioned means including a reflective coating formed on said central portion;

fixing means for fixing said housing with respect to said base;

attachment means for securely attaching said housing to said base, thereby preventing the mechanical stress and strain imparted to the device by said mechanical loads from loosening said housing and affecting the integrity of said angle;

said housing defining seating means for receiving and holding said objective in a form-tight manner;

said objective being made of transparent material having a linear coefficient of expansion selected to ensure that said objective will withstand the thermally induced stress variations caused by said heat;

elastic layer means disposed at the interface of said objective and said housing for preventing direct contact therebetween, thereby protecting said objective against damage from said mechanical loads; and, said light supply means including a prism for conducting light to said collimating mark, said housing including second seating means for receiving and holding said prism in a form-tight manner.

2. A device for generating an optical collimating beam having a defined angle with respect to a base when mounted thereon, the device and base being subjectable to extreme heat and mechanical loads such as shock, vibration or the like, the device comprising:

a metal housing;

collimating beam means for forming and transmitting said collimated beam, said collimating beam means including: a single-lens objective; a collimating mark formed on an optical surface of said objective; light supply means for illuminating said collimating mark; and, reflecting means for reflecting an image of said mark within and from said objective so as to define said optical collimating beam;

fixing means for fixing said housing with respect to said base;

attachment means for securely attaching said housing to said base, thereby preventing the mechanical stress and strain imparted to the device by said mechanical loads from loosening said housing and affecting the integrity of said angle;

said housing defining seating means for receiving and holding said objective in a form-tight manner;

said objective being made of transparent material having a linear coefficient of expansion selected to ensure that said objective will withstand the thermally induced stress variations caused by said heat;

elastic layer means disposed at the interface of said objective and said housing for preventing direct contact therebetween, thereby protecting said objective against damage from said mechanical loads;

said fixing means including a recess formed in the base and a cylindrical lug on the lower side of said housing for engaging said recess in a form-tight manner, thereby fixing the position of the device with respect to the base; and, said attachment means including at least three bolts threadably engaging the base for securely attaching said housing thereto, and means for securing said bolts against rotation, thereby preventing said housing from becoming loose when subjected to said mechanical loads.

3. A device for generating and projecting an optical collimating beam having a defined angle with respect to a base when mounted thereon, the device and base being subjectable to mechanical loads caused by shock, vibration or the like, the device comprising:

a pocket-like housing defining an opening at one end thereof;

collimating beam means mounted in said housing for forming and transmitting said collimated beam, said collimating beam means including: a lens objective defining a longitudinal axis and having two mutually adjacent optical surfaces transverse to said axis, said objective further having an outer peripheral surface of a predetermined surface contour extending between said optical surfaces in surrounding relationship to said axis; a collimating mark formed on one of said optical surfaces; a reflective coating formed on the other one of said optical surfaces so as to extend over at least the central region thereof for reflecting an image of said mark within and from said objective so as to define said optical collimating beam;

said housing defining a seat having a surface contour surrounding and complementing a first portion of said surface contour of said outer peripheral surface of said objective for receiving and holding said objective in a form-tight manner, thereby accurately fixing the position thereof with respect to said housing;

an annular holding body removably attached to said housing for holding said objective in said seat, said annular body defining an inner surface having a surface contour complementing a second portion of said surface contour of said outer peripheral surface for also holding said objective in a form-tight manner;

attachment means for securely attaching said housing to said base, thereby preventing the mechanical stress and strain caused by said shock loads from loosening said housing and affecting the integrity of said angle; and, elastic layer means sandwiched between the complementing surface contours of said objective and said housing and between the complementing surface contours of said objective and said annular body for preventing direct contact therebetween, thereby protecting said objective against damage from said mechanical loads.

4. The device of claim 3 said housing being made of metal and said coefficient of thermal expansion being less than $10^{-6} \, K^{-1}$.

5. The device of claim 3, said lens objective having a biconical outer peripheral surface between said two optical surfaces such that the central region of said outer peripheral surface defines the thickest portion of said lens objective thereby facilitating the form-tight fit in said seating means.

6. The device of claim 5, said inner surface of said annular body defining a conical surface complementing one of the conical surfaces of said biconical outer peripheral surface of said lens objective.

7. A device for generating an optical collimating beam having a defined angle with respect to a base when mounted thereon, the device and base being subjectable to extreme heat and mechanical loads such as shock, vibration or the like, the device comprising:
 a metal housing:
 collimating beam means for forming and transmitting said collimated beam, said collimating beam means including: a single-lens objective; a collimating mark formed on an optical surface of said objective; light supply means for illuminating said collimating mark; and, reflecting means for reflecting an image of said mark within and from said objective so as to define said optical collimating beam;
 fixing means for fixing said housing with respect to said base;
 attachment means for securely attaching said housing to said base, thereby preventing the mechanical stress and strain imparted to the device by said mechanical loads from loosening said housing and affecting the integrity of said angle;
 said housing defining seating means for receiving and holding said objective in a form-tight manner;
 said objective being made of transparent material having a linear coefficient of expansion selected to ensure that said objective will withstand the thermally induced stress variations caused by said heat;
 elastic layer means disposed at the interface of said objective and said housing for preventing direct contact therebetween, thereby protecting said objective against damage from said mechanical loads;
 said light supply means including a prism for conducting light to said collimating mark; and,
 said housing including second seating means for receiving and holding said prism in a form-tight manner.

* * * * *

UNITED STATES PATENT AND TRADEMARK OFFICE
CERTIFICATE OF CORRECTION

PATENT NO. : 4,704,010

DATED : November 3, 1987

INVENTOR(S) : Hans Stana et al

It is certified that error appears in the above-identified patent and that said Letters Patent is hereby corrected as shown below:

In column 2, line 33: after the word "recess" please add -- formed --.

In column 3, line 17: delete "view;" and substitute -- view, -- therefor.

In column 4, line 14: delete "acid" and substitute -- aid -- therefor.

In column 4, line 35: delete "attchment" and substitute -- attachment -- therefor.

In column 5, line 2: delete "fora" and substitute -- for -- therefor.

In column 5, line 14: after the word "said" first occurrence, please add -- first --.

In column 7, line 18: delete "housing:" and substitute -- housing; -- therefor.

Signed and Sealed this

Twenty-second Day of March, 1988

Attest:

DONALD J. QUIGG

Attesting Officer

Commissioner of Patents and Trademarks